United States Patent
Frey

(10) Patent No.: US 10,191,179 B2
(45) Date of Patent: Jan. 29, 2019

(54) MEASURING CURRENT FROM AN ELECTRODE USING A NON-LINEAR ELEMENT

(71) Applicant: Schlumberger Technology Corporation, Sugar Land, TX (US)

(72) Inventor: Mark T. Frey, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 206 days.

(21) Appl. No.: 15/193,321

(22) Filed: Jun. 27, 2016

(65) Prior Publication Data

US 2017/0370212 A1 Dec. 28, 2017

(51) Int. Cl.
| | |
|---|---|
| *E21B 47/00* | (2012.01) |
| *G01V 3/24* | (2006.01) |
| *G01V 3/38* | (2006.01) |
| *G01V 3/20* | (2006.01) |

(52) U.S. Cl.
CPC ............ *G01V 3/38* (2013.01); *E21B 47/0002* (2013.01); *G01V 3/20* (2013.01)

(58) Field of Classification Search
CPC ... G01V 3/24; G01V 3/28; G01V 3/26; G01V 3/18; E21B 47/01; E21B 17/028; E21B 47/00

See application file for complete search history.

(56) References Cited

U.S. PATENT DOCUMENTS

| 5,463,320 A * | 10/1995 | Bonner | G01V 3/20 324/366 |
|---|---|---|---|
| 6,173,793 B1 * | 1/2001 | Thompson | E21B 47/01 175/24 |
| 7,990,153 B2 | 8/2011 | Clark et al. | |
| 2004/0090234 A1 * | 5/2004 | Macune | G01V 3/30 324/337 |

(Continued)

OTHER PUBLICATIONS

Yi et al., Passive Frequency Doubling Antenna Sensor for Wireless Strain Sensing, Proceedings of the ASME 2012 Conference on Smart Materials, Adaptive Structures and Intelligent Systems SMASIS2012, Sep. 19-21, 2012, Stone Mountain, Georgia, USA.

*Primary Examiner* — Kipp C Wallace

(57) ABSTRACT

An arrangement for generating a resistivity image having a drill bit with cutters configured to be placed within a wellbore, the cutters configured to create further sections of the wellbore upon rotation, the drill bit having an end with threads for engagement, at least one section of drill string connected to the drill bit through a matching set of threads for engagement, a receiver toroid connected to the at least one section of drill string along at least a portion of the drill string, a transmitter toroid connected to the at least one section of drill string and located at least a portion of the drill string away from the receiver toroid, at least one stabilizer connected to the at least one section of drill string, a power source connected to the transmitter toroid and the receiver toroid, an electrode arrangement placed at the drill bit, wherein the electrode arrangement is electrically connected to the drill bit through a non-linear circuit element and a computer arrangement connected to the receiver toroid.

15 Claims, 2 Drawing Sheets

(56) References Cited

U.S. PATENT DOCUMENTS

| | | | |
|---|---|---|---|
| 2011/0057656 A1* | 3/2011 | Tchakarov | E21B 10/00 324/369 |
| 2012/0024600 A1* | 2/2012 | Bittar | E21B 47/01 175/50 |
| 2013/0088364 A1* | 4/2013 | Bittar | E21B 47/01 340/856.3 |
| 2013/0144530 A1* | 6/2013 | Bittar | G01V 3/28 702/7 |
| 2013/0270008 A1 | 10/2013 | DiGiovanni et al. | |
| 2018/0252837 A1* | 9/2018 | Tang | G01V 3/24 |

* cited by examiner

MEASURING CURRENT FROM AN ELECTRODE USING A NON-LINEAR ELEMENT

CROSS-REFERENCE TO RELATED APPLICATIONS

None.

FIELD OF THE INVENTION

Aspects of the disclosure relate to the drilling of wellbores to recover hydrocarbon materials from geological stratum or geological formations. More specifically, aspects of the disclosure relate to measurements of currents from electrodes using non-linear elements placed in, for example, a drill bit arrangement, to aid in drilling operations.

BACKGROUND INFORMATION

Embedding electrodes in drill bits used in the recovery of hydrocarbons can provide many advantages for operators of drilling equipment. The embedment of electrodes can provide a data source upon which operators can rely to determine the physical characteristics of the wellbore during the drilling process.

In conventional drilling scenarios, a model is developed by engineers prior to drilling a wellbore. Data from pre-drilling investigations, i.e. seismic surveys, are placed into the computer modeling system to allow the overall drilling trajectory to be determined to maximize the economics of the well by minimizing the amount of drilling and maximizing the amount of wellbore in pay areas.

While having a drilling model helps to plan the well, operators must be able to accurately track the wellbore progress during the drilling process. Without a reference source to determine positioning of the wellbore, operators are forced to guess where the position of the drill bit by using rudimentary calculations of assumed angles and numbers of drill string pieces used. This creates a "zone of uncertainty" during the drilling process that can lead to loss of contact between the wellbore and the geological stratum which contains the hydrocarbons. During ever increasing and lengthening drilling projects, the zone of uncertainty grows such that the positioning of the wellbore can be merely a guess by operators. As drilling projects can be very time consuming and laborious, the costs of a drilling project may be very expensive. Limiting possible zones of uncertainty can yield to significant reductions in expenditures on such projects by maintaining a maximum amount of contact between the wellbore and the hydrocarbon bearing stratum.

Feedback of data from the wellbore drill bit can provide a wealth of information when the data is related to positioning information. Unfortunately, retaining such data is very difficult and in conventional systems impossible. Drill bits, for example, have very limited location for electrode or sensor placement as well as wire placement within the drill bit. During normal drilling operations, operators try to perform various evaluations using conventional apparatus. While these various conventional evaluations, such as resistivity analysis of the geological formation, may help operators reduce the zone of uncertainty, their relative position on the drill string limit their overall effectiveness. If data for the evaluations could be attained closer to the drill bit, the ultimate evaluations would minimize error. Optimally, if the evaluations could be performed at the drill bit itself, operators could minimize the overall uncertainty of the evaluation process and the evaluations relevancy to the drill bit. There is thus a need for a method and apparatus to aid drillers in providing data from the drill bit such that drillers can accurately position the wellbore and reduce the zone of uncertainty.

SUMMARY

The following summary provides one example embodiment described in the detailed description. The summary, therefore, should not be used to limit the overall scope the invention and the summary should not be considered limiting. In one example embodiment, an arrangement for drilling a wellbore is disclosed comprising a drill bit with cutters, at least one section of drill string connected to the drill bit, a receiver toroid connected to the at least one section of drill string, a transmitter toroid connected to the at least one section of drill string and a sensor placed at the drill bit, wherein the sensor is electrically connected to the drill bit through a non-linear circuit element.

In a further non-limiting embodiment, an arrangement for generating a resistivity image is disclosed, comprising a drill bit with cutters configured to be placed within a wellbore, the cutters configured to create further sections of the wellbore upon rotation, the drill bit having an end with threads for engagement, at least one section of drill string connected to the drill bit through a matching set of threads for engagement, a receiver toroid connected to the at least one section of drill string along at least a portion of the drill string; a transmitter toroid connected to the at least one section of drill string and located at least a portion of the drill string away from the receiver toroid, at least one stabilizer connected to the at least one section of drill string, the stabilizer configured to stabilize the at least one section of drill string and the drill bit upon rotation of the connected drill string and the drill bit by contacting an exterior portion of the wellbore, a power source connected to the transmitter toroid and the receiver toroid and a sensor placed at the drill bit, wherein the sensor is electrically connected to the drill bit through a non-linear circuit element.

In another non-limiting embodiment, an arrangement for generating a resistivity image is disclosed having a drill bit with cutters configured to be placed within a wellbore, the cutters configured to create further sections of the wellbore upon rotation, the drill bit having an end with threads for engagement, at least one section of drill string connected to the drill bit through a matching set of threads for engagement, a receiver toroid connected to the at least one section of drill string along at least a portion of the drill string, a transmitter toroid connected to the at least one section of drill string and located at least a portion of the drill string away from the receiver toroid, at least one stabilizer connected to the at least one section of drill string, the stabilizer configured to stabilize the at least one section of drill string and the drill bit upon rotation of the connected drill string and the drill bit by contacting an exterior portion of the wellbore, a power source connected to the transmitter toroid and the receiver toroid, a sensor placed at the drill bit, wherein the sensor is electrically connected to the drill bit through a non-linear circuit element and a computer arrangement connected to the receiver toroid, the computer arrangement configured to receive data from the receiver toroid and generate a resistivity image.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
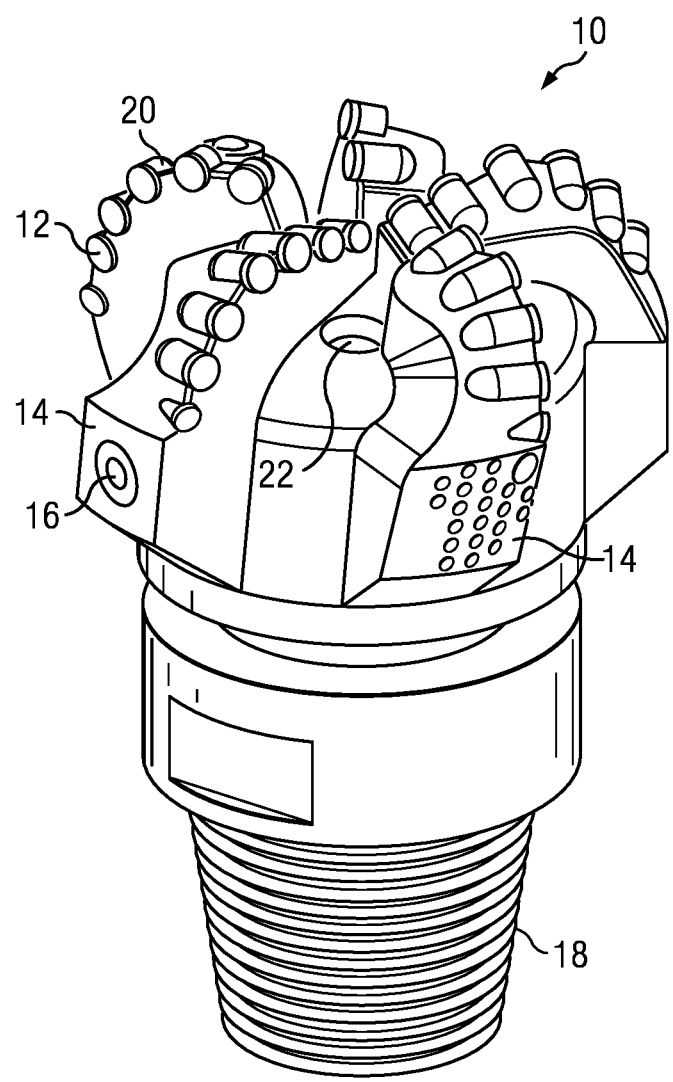
FIG. 1 is a perspective view of an electrode embedded in a drill bit.

Referring to FIG. 1, an electrode embedded bit arrangement 10 is illustrated. The electrode embedded bit arrangement 10 is connected to the remainder of the drill system through a thread connection 18. In the illustrated embodiment, an American Petroleum Institute ("API") thread connection is used. Other mechanical fastening arrangements may be used such that rotation of a drill string, in turn, causes the electrode embedded bit arrangement 10 to rotate. Rotation of the electrode embedded bit arrangement 10 may be accomplished through a rotary table or top drive assembly, as non-limiting embodiments.

Upon rotation, the electrode embedded bit arrangement 10 contacts a geological formation through use of cutters 12 placed on the crown 20 of the electrode embedded bit arrangement 10. The cutters 12 are configured such that rotation of the electrode embedded bit arrangement 10 causes the geological formation to break, shear or otherwise be compromised by the cutters 12. In the illustrated embodiment, the cutters 12 illustrated are configured in a round shape. The material used in the cutters 12, in a non-limiting embodiment, is a polycrystalline diamond compact arrangement, hereinafter ("PDC"). In other non-limiting embodiments, tungsten insert carbide cutters may be used. In still another non-limiting embodiment, a ridged diamond element bit may be used. In another further non-limiting embodiment, rotating cutters may be used to limit the amount of wear on the contact face of the cutter 12.

Gauge pads 14 are placed on the electrode embedded bit arrangement 10 around selected positions on the periphery of the electrode embedded bit arrangement 10. An electrode insulator arrangement 16, described later, is placed along one gauge pad of the electrode embedded bit arrangement 10. Although illustrated as a single electrical sensor, the description should not be considered to be limited to such a configuration. The gauge pads 14 are placed on the periphery of the drill bit arrangement 10 to provide an outward contact limit of the electrode embedded bit arrangement 10 within the wellbore. The gauge pads 14 may be diamond impregnated surfaces to limit overall wearing of the gauge pads 14. On the top side surface of the gauge pads 14, a cutting element may be placed such that pull-out of the wellbore by the electrode embedded bit arrangement 10 can be facilitated and stick may be minimized. In the illustrated embodiment depicted in FIG. 1, the electrode embedded bit arrangement 10 is rotated counter clockwise such that the flat portions of the PDC cutters 12 contact the geological formation. Ports 22, may be added to the arrangement 10 such that fluid may be pumped through the drill string, through the thread connection 18 and out the ports 22. The purpose of the drilling fluid pumped through the ports 22 is to remove degraded rock, soil and minerals from the wellbore through the fluid being pushed up an annulus of the drill string.

The matrix materials used to create the body of the arrangement 10 in the illustrated embodiment may be varied to achieve a sufficiently rigid body to support the cutters 12. The base matrix materials used to create the body of the arrangement may not only have ports 22 but also inserted nozzles such that fluid may be more evenly dispersed or dispersed to areas needed in the drill bit arrangement 10. In the illustrated embodiment, a configuration is provided where 5 ports 22 are illustrated. In this embodiment, the number of ports is limited to allow for larger openings so that removed materials from the geological formation do not clog the port(s). In the case where materials broken from the geological stratum are not of sufficient size to clog the ports 22, the number of ports 22 may be increased.

Figure 2:
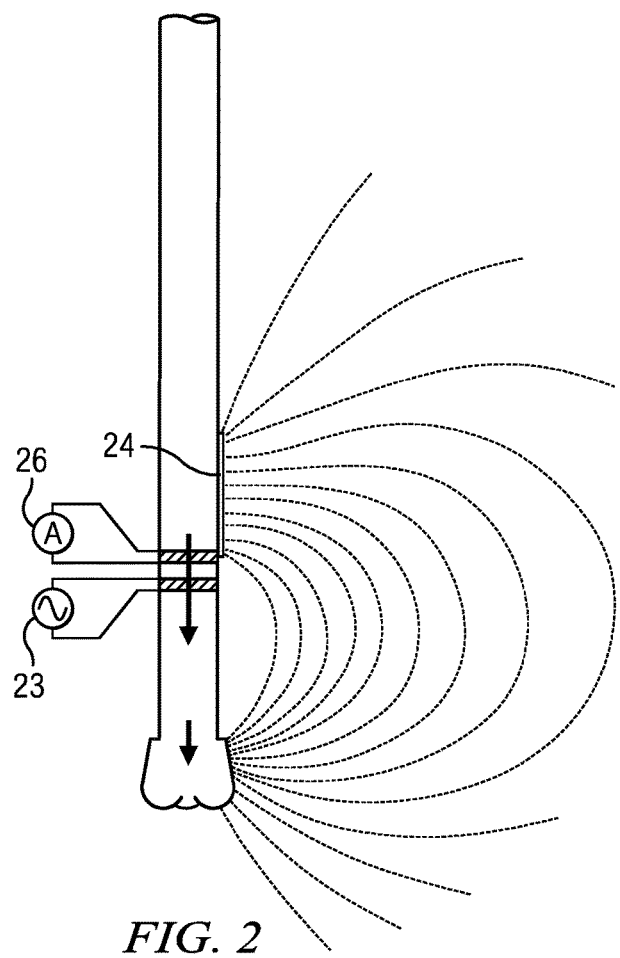
FIG. 2 is a side elevation view of a drilling tool using a resistivity based technique to obtain data from a geological formation.

Referring to FIG. 2, a side elevation of an arrangement placed in an oil based mud is illustrated. In the illustrated embodiment, a receiver toroid 26 is placed upstream from a transmitter toroid 23. In this embodiment, one cutter of a drill bit arrangement 10 is insulated from an electrically connected bit body through a non-linear circuit element, such as that disclosed in FIG. 3 and FIG. 1.

FIG. 2, illustrates how the bit resistivity measurement in an oil-based mud works with a tool. One toroid transmitter 23 positioned over the drill collar generates an alternating current voltage across the drill collar or drill string after receiving power from an electrical circuit, such as a battery arrangement. The battery arrangement can be located inside the drill string of the bottom hole assembly. Since the bit arrangement 10 is the only part of the bottom hole assembly in contact with the geological formation below the transmitter toroid 23, current will flow out from the bit arrangement 10 and return higher up the bottom hole assembly where there is some contact with the formation, for example, on a stabilizer 24. A receiver toroid 26 is used to measure the current flowing along the collar as illustrated. In the illustrated embodiment, the receiver toroid 26 is placed as close to the stabilizer 24 such that signal attenuation is prevented.

In this non-limiting embodiment provided in FIG. 2, the current flowing out of the cutter/electrode will be at two times the excitation frequency of the transmitter. This current harmonic can be measured by the receiver toroid 26 in addition to the fundamental (if the toroid and measuring circuit are sufficiently linear themselves). In this way, the current leaving just the electrode can be distinguished from the current leaving the rest of the bit body and used to generate a resistivity image.

A computer arrangement may be connected to the receiver toroid 26 such that signals received from the receiver toroid 26 may be converted into a resistivity image. In the illustrated embodiment, the computer arrangement is positioned at the well head and the signal may be transported from the receiver toroid though various methods and apparatus, such as wired drill pipe. The computer arrangement may have a visual display apparatus to pictorially represent data to an operator in real time so that operator decisions may be made related to drilling progress. The computer arrangement may be a personal computer, laptop or portable handheld unit to aid the operators in making drilling decisions.

In the arrangement shown in FIG. 2, an oil based mud is used to enhance the overall signal capabilities of the system. Such oil based muds are typically non-conductive muds which aid in resistivity signal generation for the geological formation. Other types of muds that are non-conductive may be used, such as synthetic based systems from M-I. SWACO, Inc. Alternative configurations may include diesel-based fluid systems or mineral oil type systems.

Figure 3:
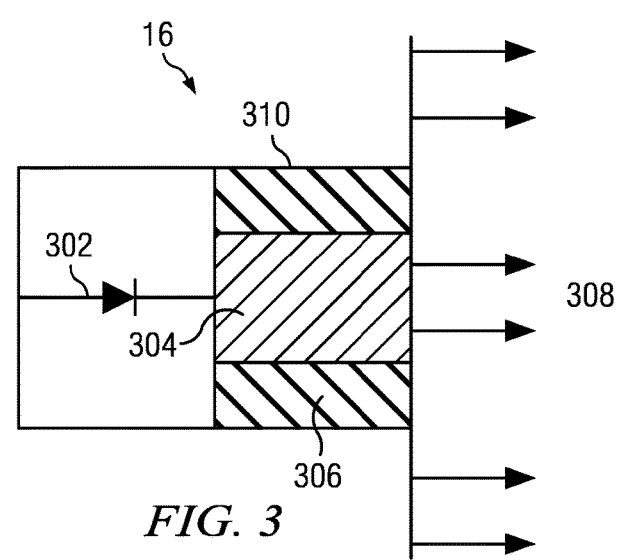
FIG. 3 is a side view of an electrode and insulator arrangement in position next to a geological formation.

Referring to FIG. 3, a side elevation of an electrode insulator arrangement 16 is illustrated. The electrode insulator arrangement 16 may be used in the configuration presented in FIG. 1 and FIG. 2, above. In the electrode insulator arrangement 16, a diode 302 is connected to an electrode 304. Around the periphery of the electrode 304, an insulator 306 is positioned to insulate the electrode 304 from contacts other than the diode 302 and directly in contact with the formation 308. Surrounding metal 310, such as that from a drill bit arrangement 10, may be located to house the diode 302, insulator 306 and the electrode 304.

The diode 302 is positioned, in the illustrated embodiment, with the cathode side positioned toward the formation side. This positioning allows for one way flow of electricity through the diode 302 toward the formation. The diode 302 may be constructed from silicon, selenium or germanium as applicable. The overall electrode insulator arrangement 16 may be designed such that the expected temperatures that the arrangement 16 will encounter will not deleteriously compromise the integrity of the diode 302.

In one non-limiting embodiment, an arrangement for drilling a wellbore, is disclosed having a drill bit with cutters, at least one section of drill string connected to the drill bit, a receiver toroid connected to the at least one section of drill string; a transmitter toroid connected to the at least one section of drill string and an electrode arrangement placed at the drill bit, wherein the electrode arrangement is electrically connected to the drill bit through a non-linear circuit element.

In another non-limiting embodiment, the arrangement for drilling a wellbore described above may also be configured wherein the electrode arrangement is placed at a gauge pad of the drill bit.

In another non-limiting embodiment, the arrangement for drilling a wellbore described above may also be configured wherein the cutters are polycrystalline diamond cutters.

In another non-limiting embodiment, the arrangement for drilling a wellbore described above may be configured wherein the non-linear circuit element comprises a diode with an anode and a cathode and an electrode connected to the cathode of the diode.

In another non-limiting embodiment, the arrangement for drilling a wellbore described above may be configured wherein the electrode further comprises an insulator placed to at least one exterior side of the electrode.

In another non-limiting embodiment, the arrangement for drilling a wellbore described above may be configured wherein the non-linear circuit element is configured such that excitation of the transmitter toroid will cause a current flowing out of the electrode to be at least twice an excitation frequency of the transmitter.

In another non-limiting embodiment, the arrangement for drilling a wellbore described above may further comprise at least one contact point arrangement on the at least one section of drill string, the at least one contact point arrangement connecting the at least one section of drill string and a geological formation.

In another non-limiting embodiment, the arrangement for drilling a wellbore described above may be configured wherein the at least one contact point arrangement is a stabilizer.

In another non-limiting embodiment, the arrangement for drilling a wellbore described above may further comprise at least one computing arrangement, the at least one computing arrangement connected to the receiving toroid, the computing arrangement configured to receive data from the receiver toroid to produce a resistivity image.

In another non-limiting embodiment, an arrangement for generating a resistivity image is disclosed comprising a drill bit with cutters configured to be placed within a wellbore, the cutters configured to create further sections of the wellbore upon rotation, the drill bit having an end with threads for engagement, at least one section of drill string connected to the drill bit through a matching set of threads for engagement, a receiver toroid connected to the at least one section of drill string along at least a portion of the drill string, a transmitter toroid connected to the at least one section of drill string and located at least a portion of the drill string away from the receiver toroid, at least one stabilizer connected to the at least one section of drill string, the stabilizer configured to stabilize the at least one section of drill string and the drill bit upon rotation of the connected drill string and the drill bit by contacting an exterior portion of the wellbore, a power source connected to the transmitter toroid and the receiver toroid, an electrode arrangement placed at the drill bit, wherein the sensor is electrically connected to the drill bit through a non-linear circuit element and a computer arrangement connected to the receiver toroid, the computer arrangement configured to receive data from the receiver toroid and generate a resistivity image.

In another non-limiting embodiment, the arrangement for drilling a wellbore described above may be configured wherein the arrangement according to claim 10, wherein the power source is one of a downhole battery and a turbine arrangement configured to convert fluid motion in the wellbore to electrical energy.

In another non-limiting embodiment, the arrangement for drilling a wellbore described above may be configured wherein the non-linear circuit element is a diode arrangement.

In another non-limiting embodiment, the arrangement for drilling a wellbore described above may be configured wherein the computer arrangement connected to the receiver toroid is positioned outside of the wellbore.

Although methods for inverting electromagnetic logging measurements have been described in detail, it should be understood that various changes, substitutions and alternations can be made herein without departing from the spirit and scope of the disclosure as defined by the appended claims.

What is claimed is:

1. An arrangement for drilling a wellbore, the arrangement comprising:
 a drill bit comprising a plurality of cutting elements deployed in a bit body; the drill bit connected to a length of drill string;
 a transmitter toroid deployed on the length of drill string and configured to transmit an AC voltage at a first frequency;
 a receiver toroid deployed on the length of drill string and configured to receive an alternating current at a harmonic of the first frequency; and
 at least one electrode deployed in the bit body, the at least one electrode being electrically insulated from the bit body and being electrically connected to the length of drill string through a non-linear circuit element such that alternating current emanating from the at least one electrode is at the harmonic of the first frequency when the transmitter toroid transmits at the first frequency.

2. The arrangement of claim 1, wherein the receiver toroid is deployed uphole of the transmitter toroid.

3. The arrangement according to claim 1, wherein the at least one electrode is deployed on a gauge pad of the drill bit.

4. The arrangement according to claim 1, wherein the cutting elements are polycrystalline diamond cutters.

5. The arrangement according to claim 1, wherein the non-linear circuit element comprises a diode with an anode and a cathode, the at least one electrode electrically connected to the cathode and the length of drill string electrically connected to the anode.

6. The arrangement according to claim 5, wherein the diode is configured such that the harmonic of the first frequency is twice the first frequency.

7. The arrangement according to claim 1, wherein the length of drill string further comprises a stabilizer configured to contact an exterior portion of the wellbore.

8. The arrangement according to claim 1, further comprising at least one computing arrangement, the at least one computing arrangement connected to the receiving toroid, the computing arrangement configured to receive data from the receiver toroid to produce a resistivity image.

9. The arrangement of claim 7, wherein the transmitter toroid is deployed downhole from the stabilizer and the receiver toroid is deployed axially between the transmitter toroid and the stabilizer.

10. The arrangement of claim 8, wherein the data processed by the computer arrangement to generate the resistivity image comprises alternating current received at the harmonic of the first frequency.

11. An arrangement for generating a resistivity image, comprising:
   a drill bit comprising a plurality of cutting elements deployed in a bit body configured to be placed within a wellbore, the cutting elements configured to create further sections of the wellbore upon rotation, the drill bit having an end with threads for engagement;
   at least one section of drill string connected to the drill bit through a matching set of threads for engagement;
   a transmitter toroid deployed on the at least one section of drill string and configured to transmit an AC voltage at a first frequency;
   a receiver toroid deployed on the at least one section of drill string and axially spaced apart from the transmitter toroid, the receiver toroid configured to receive an alternating current at a harmonic of the first frequency;
   at least one stabilizer connected to the at least one section of drill string, the stabilizer configured to stabilize the at least one section of drill string and the drill bit upon rotation of the drill string and the drill bit by contacting an exterior portion of the wellbore;
   a power source connected to the transmitter toroid and the receiver toroid;
   an electrode deployed in the bit body, the electrode being electrically insulated from the bit body and being electrically connected to the at least one section of drill string through a non-linear circuit element such that alternating current emanating from the electrode is at the harmonic of the first frequency when the transmitter toroid transmits at the first frequency; and
   a computer arrangement connected to the receiver toroid, the computer arrangement configured to receive data from the receiver toroid and generate a resistivity image.

12. The arrangement according to claim 11, wherein the power source is one of a downhole battery and a turbine arrangement configured to convert fluid motion in the wellbore to electrical energy.

13. The arrangement according to claim 11, wherein the non-linear circuit element is a diode arrangement.

14. The arrangement according to claim 11, wherein the computer arrangement connected to the receiver toroid is positioned outside of the wellbore.

15. The arrangement of claim 11, wherein the data processed by the computer arrangement to generate the resistivity image comprises alternating current received at the harmonic of the first frequency.

* * * * *